ったら
3,137,644
PROCESS FOR THE MANUFACTURE OF 1,1,2-TRICHLOROETHANE

Horst Bretschneider, Burgkirchen, Upper Bavaria, Germany, assignor to Farbwerke Hoechst Aktiengesellschaft vormals Meister Lucius & Bruning, Frankfurt am Main, Germany, a corporation of Germany
No Drawing. Filed Dec. 29, 1960, Ser. No. 79,125
Claims priority, application Germany Dec. 30, 1959
5 Claims. (Cl. 204—163)

The present invention relates to a process for the manufacture of 1,1,2-trichloroethane.

It is known that trichloroethane can be obtained by additive combination of chlorine with vinyl chloride and that this reaction can also take place between the gaseous components, the reaction being catalyzed by irradiation with light or with the use of a ferric chloride catalyst or a similar substance. Contacting the two gases with one another involves the risk of deflagration taking place with separation of carbon in view of the fact that the reaction generally takes a violent course and often involves local superheating. It is also known that the reaction can be carried out in a much more harmless manner by carrying out the operation at a maximum temperature of 80° C. with irradiation of light or at 140–150° C. without irradiation of light. It was found, however, that even these conditions do not permit undisturbed reaction and they are therefore unsatisfactory for carrying out the reaction on an industrial scale. A mixture of vinyl chloride and chlorine may even deflagrate at a temperature below 80° C. notwithstanding effective cooling. On the other hand, the reaction proceeds too slowly when a higher temperature is used without irradiation of light.

The present invention is based on the observation that vinyl chloride or gases containing it can be converted with chlorine gas under the action of light and at temperatures between 0° and 200° C., advantageously, 50° and 150° C. without separation of carbon black and without ignition taking place into 1,1,2-trichloroethane by admixing at least one of the two reactants with 1,1,2-trichloroethane in a proportion such that the partial pressure of 1,1,2-trichloroethane in the reaction mixture amounts to at least 10–50% of the total pressure, and regulating the reaction velocity by irradiating the reaction mixture with measured quantities of light and distributing the light in the reaction mixture.

Vinyl chloride is advantageously mixed with a crude reaction product which substantially consists of 1,1,2-trichloroethane. Such reaction product is made according to this invention by passing gaseous vinyl chloride before it enters the reaction zone over or through trichloroethane, which is advantageously heated, so that the vinyl chloride is charged with 1,1,2-trichloroethane in a manner corresponding to the respective vapor tension. Alternatively, liquid vinyl chloride may be introduced into warm trichloroethane and allowed to evaporate.

According to a special variant of the present process, vinyl chloride is charged with trichloroethane in vapor form in the reaction zone proper rather than outside said zone. In this variant of the process, vinyl chloride is intimately contacted immediately before it enters the reaction zone proper with warm reaction product leaving the reaction zone. This operation may also be carried out in the presence of an additional inert gas, such as nitrogen or argon, and under reduced or superatmospheric pressure.

In this manner, vinyl chloride can be reacted with chlorine under the action of light in any appropriate and even large-dimensioned apparatus, for example a reaction tower of glass, without deflagration taking place. As compared with the catalytic reaction with exclusion of light, the process of this invention offers the special advantage that the reaction temperature can be regulated not only by cooling but also by the supply and distribution of measured quantities of irradiating light. This may be done, for example, by changing the luminosity of the light sources or distance from which these light sources are allowed to irradiate the reaction mixture. These steps avoid more especially local superheating. In other words, the reaction can be performed in safe manner and under optimum conditions in a wide range of temperature, for example of 0° to 200° C., and preferably at 50 to 150° C.

The yield of 1,1,2-trichloroethane in the gaseous phase is almost quantitative in the optimum temperature range of about 70 to 150° C. Hydrogen chloride as by-product, which indicates the degree of substitution, is evolved in a proportion of at most 3 mol percent, calculated on the chlorine used.

The process of this invention thus distinguishes favorably over the known chlorination in the liquid phase which involves more than 5% of higher chlorinated by-products when carried out under light above 50° C. The technical advance achieved by the process of this invention is that the danger of deflagration is avoided, and the formation of higher chlorinated by-products is substantially suppressed.

In carrying out the process of this invention, chlorine is generally used in at least equimolecular amounts, calculated on the vinyl chloride, and advantageously in an excess of about 5 to 10 mol percent over vinyl chloride.

The slight sources used for the temperature-regulated exposure of the reaction zone which more especially regulates the reaction velocity, are, for example, ordinary lamps, such as incandescent lamps, luminous lamps or so-called blue light lamps, whose irradiation encompasses the spectral region of 0.35 to 1.0$\mu$.

The process of this invention enables pure vinyl chloride or vinyl chloride in admixture with other gases as they are obtained, for example, by thermal cracking of 1,2-dichloroethane, to be converted with chlorine into 1,1,2-trichloroethane.

Contrary to known processes, the process of this invention can be carried out at temperatures as high as 200° C. which are especially favorable for the dissipation of the reaction heat evolved in view of the fact that lower temperatures may involve great expense in apparatus for gas cooling.

The following examples serve to illustrate the invention, but they are not intended to limit it thereto:

Example 1

Vinyl chloride passed through trichloroethane of 90° C. and chlorine were introduced from below each at a rate of 200 liters/hour into a vertically arranged glass tube 60 cm. long and 40 mm. wide and provided with a reflux condenser. The glass tube was not cooled and was irradiated using a luminous lamp arranged parallel to said glass tube. The luminous lamp was at a distance of about 160 mm. from the glass tube, was 115 cm. long and operated with 40 watts.

Due to the reaction heat set free, the temperature in the interior of the tube rose to about 220° C. without ignition taking place or carbon black being separated. 1200 grams/hour of a liquid mixture containing 91% 1,1,2-trichloroethane and about 9% higher chlorinated ethane was obtained. 7 mol percent hydrogen chloride containing a little vinyl chloride escaped as residual gas at the head of the glass tube.

Example 2

The procedure was the same as described in Example 1, but the luminosity of the lamp was reduced and the reaction zone was cooled to an internal temperature of 80–90° C. Only 2.6 mol percent hydrogen chloride evolved, calculated on the chlorine supplied. The liquid reaction mixture contained 97% 1,1,2-trichloroethane and only about 3% higher chlorinated hydrocarbons.

I claim:

1. A process for the photocatalytic preparation of 1,1,2-trichloroethane in about quantitative yields from vinyl chloride and chlorine in the gaseous phase at a temperature between 0 and 200° C., comprising admixing at least one of the reactants selected from the group consisting of vinyl chloride and chlorine with 1,1,2-trichloroethane before the reactants are photocatalytically reacted in a reaction zone in a proportion such that the partial pressure of 1,1,2-trichloroethane in the reaction mixture amounts to 10–50% of the total pressure, passing the mixture into said reaction zone, and regulating the reaction velocity in said zone by irradiating the reaction mixture with measured quantities of light and distributing the light in the reaction mixture.

2. The process of claim 1 wherein the vinyl chloride to undergo reaction is first charged with said 1,1,2-trichloroethane so that the partial pressure of the 1,1,2-trichloroethane amounts to 10–50% of the total pressure of the starting mixture.

3. The process of claim 1 wherein at least one of the reactants is charged before reaction with the mixture obtained as final reaction product and substantially consisting of 1,1,2-trichloroethane.

4. The process of claim 1 wherein a gas mixture containing vinyl chloride is used as starting material to be chlorinated.

5. The process of claim 1 wherein the reaction velocity is regulated by temperature-regulated exposure of the reaction zone.

References Cited in the file of this patent

UNITED STATES PATENTS

| | | |
|---|---|---|
| 1,833,393 | Ernst et al. | Nov. 24, 1931 |
| 2,621,153 | Meyer et al. | Dec. 9, 1952 |
| 2,674,573 | Crauland | Apr. 6, 1954 |